United States Patent
Anant et al.

(10) Patent No.: US 10,677,499 B2
(45) Date of Patent: Jun. 9, 2020

(54) CLOSED-CYCLE CRYOGENIC REFRIGERATION SYSTEM

(71) Applicant: Photon Spot, Inc., Monrovia, CA (US)

(72) Inventors: Vikas Anant, La Crescenta, CA (US); Brian Siu-Fung Ma, Cupertino, CA (US)

(73) Assignee: Photon Spot, Inc., Monrovia, CA (US)

( * ) Notice: Subject to any disclaimer, the term of this patent is extended or adjusted under 35 U.S.C. 154(b) by 128 days.

(21) Appl. No.: 15/422,935

(22) Filed: Feb. 2, 2017

(65) Prior Publication Data

US 2017/0146266 A1 May 25, 2017

Related U.S. Application Data

(63) Continuation-in-part of application No. 14/086,277, filed on Nov. 21, 2013, now abandoned.

(60) Provisional application No. 61/906,768, filed on Nov. 20, 2013.

(51) Int. Cl.
| | |
|---|---|
| *F25B 9/12* | (2006.01) |
| *F25B 17/08* | (2006.01) |
| *F25B 25/00* | (2006.01) |

(52) U.S. Cl.
CPC .............. *F25B 9/12* (2013.01); *F25B 17/08* (2013.01); *F25B 25/00* (2013.01); *Y02A 30/278* (2018.01); *Y02B 30/64* (2013.01)

(58) Field of Classification Search
CPC ..................................... F25B 9/12; F25B 9/10
See application file for complete search history.

(56) References Cited

U.S. PATENT DOCUMENTS

| | | | |
|---|---|---|---|
| 3,447,333 A | 6/1969 | Goodstein | |
| 2008/0209920 A1* | 9/2008 | Mikheev | F25B 17/00 62/55.5 |
| 2010/0281885 A1 | 11/2010 | Black et al. | |
| 2015/0135731 A1* | 5/2015 | Anant | F25B 9/12 62/51.1 |

FOREIGN PATENT DOCUMENTS

FR 2501347 9/1982

OTHER PUBLICATIONS

R.S. Bhatia et al., "A three-stage helium sorption refrigerator for cooling of infrared detectors to 280 mK", Cryogenics, 2000, p. 685-691, vol. 40, Elsevier.
M.J Devlin et al., "A high capacity completely closed-cycle 250 mK He refrigeration system based on a pulse tube cooler", Cryogenics, 2004, p. 611-616, vol. 44, Elsevier.
R.S. Bhatia et al., "Closed cycle cooling of infrared detectors to 250 mK", Cryogenics, 2002, p. 113-122, vol. 42, Elsevier.
J. Lau et al., Experimental tests and modeling of the optimal orifice size for a closed cycle He sorption refrigerator:, Cryogenics, 2006, p. 809-814, vol. 46, Elsevier and ScienceDirect.

* cited by examiner

*Primary Examiner* — Brian M King
(74) *Attorney, Agent, or Firm* — Instrinsic Law Corp.

(57) ABSTRACT

A multi-stage closed-cycle cryogenic refrigeration system is disclosed. The system includes an adsorption refrigerator having a multi-chambered pump unit that can be flexibly configured in the context of the cryogenic refrigeration system resulting in a more efficient design that has a smaller overall size than prior systems and other advantages.

11 Claims, 8 Drawing Sheets

CLOSED-CYCLE CRYOGENIC REFRIGERATION SYSTEM

RELATED APPLICATIONS

This application is a continuation-in-part of U.S. application Ser. No. 14/086,277, filed on Nov. 21, 2013 and entitled "Closed-Cycle Cryogenic Refrigeration System," which claims priority to U.S. Provisional Application No. 61/906,768, filed on Nov. 20, 2013 and entitled "Closed-Cycle Cryogenic Refrigeration System," each of which is hereby incorporated by reference.

TECHNICAL FIELD

The present disclosure relates to cryogenic refrigeration systems, and more particularly, to a closed-cycle cryogenic refrigeration system having a sorption refrigeration unit including a sorption pump assembly.

BACKGROUND

Refrigeration devices are a kind of apparatus that cools objects or maintains them at a reduced temperature. Cooling and refrigeration systems take many forms depending on the application for which they are used. Conventional household refrigerators designed to temporarily preserve foods operate around the freezing temperature of water, 273 degrees Kelvin (273K), and operate on a closed-cycle that evaporates and condenses a refrigerant. Scientific, medical and industrial refrigeration systems may rely on cooling provided by liquified gases. Liquid nitrogen based cooling devices generally provide temperatures around the transition temperature of this substance, 77K. Liquid helium based cooling systems generally provide temperatures around the transition temperature of this substance, 4K, and are used to maintain superconductivity in medical imaging systems as one example of their use.

However, some applications require even lower temperatures than those afforded by liquid gas based cooling systems or conventional refrigerators. Examples are scientific systems where even a slight elevation in temperature could adversely impair the operations of a scientific instrument such as a photon detector or a sensitive telescope. Such systems are described in the prior art, for example Devlin, et al., in *Cryogenics* 44 (2004) and demonstrate capabilities to reach within several hundred milli-Kelvins of absolute zero (0K). In order to reach such low temperatures, cryogenic systems usually employ multiple stages, each providing cooling to a successively lower temperature than its preceding stage and may culminate in one or more helium adsorption pump-evaporator units.

Cryogenic refrigeration systems have been in development and use since the 1970s for cooling materials, experiments and instruments to very low temperatures in order to take advantage of material properties at such temperatures. Many technologies have emerged to generate increasingly lower temperatures, from 100K all the way down to 2-10 mK (as in the case of helium dilution refrigerators) or even lower (through nuclear demagnetization cooling). The more extreme their capabilities, however, the larger and costlier cryogenic refrigeration becomes, often requiring the consumption of expensive cryogens such as liquid helium. In order to reduce the size and cost of cryogenic cooling while maintaining significant cooling performance, cryogenic adsorption refrigerators (sometimes referred to as "sorption fridges") have been developed which contain no moving parts, self-contain their necessary refrigerant(s) and can be constructed in very compact shapes.

The principle of operation of sorption refrigeration device derives from their ability to exploit adherence and absorption (collectively causing adsorption) in some substances under some conditions. The result is a component in the adsorption refrigerator that causes a thin film of a gas or liquid solute to adsorb onto a surface of a solid sorbant material. A typical adsorption refrigerator has several main components. These include a sorbent filled pump, a condenser, and an evaporator, usually connected to one another by a gas-filled tube, and these components are kept under elevated static pressures (e.g., several hundred psi or more). The gas can be He-3 or He-4. The gas is cooled to its condensation temperature so that it is liquified in the evaporator portion of the system. Meanwhile, the gas is adsorbed in the pump portion of the refrigerator during operation (e.g., using a thermal switch) so as to lower the pressure in the evaporator portion of the refrigerator. This causes the liquified gas (e.g., liquid helium) to evaporate from the evaporator portion of the system. When all of the liquified gas evaporates to return to its gaseous state, the pump is heated, and the gas is desorbed. The cycle is repeated to continue the operation of the refrigerator.

Sorption refrigerators are (in their simplest form) based on an on-time/off-time duty cycle: during the off-time, gaseous refrigerant is extracted from the adsorber and condensed within the evaporator (or "pot"), until there is significant refrigerant condensed within the pot. When the adsorber is switched from a desorbing mode to an adsorbing mode, the resulting negative pressure pumps on the refrigerant in the pot and causes it to evaporate, taking heat from the cold head surface of the pot, cooling it below the temperature of the liquid refrigerant.

The materials and construction of the adsorber, and the method of controlling the adsorbing and desorbing behavior of the adsorber determine the operation of a sorption refrigerator. Activated carbon or charcoal are often used as the adsorber material as they are affordable, have high surface area for adsorbing gasses and their adsorb/desorb behavior is easily controlled by manipulating the temperature of the carbon or charcoal. This manipulation, in the case of many cryogenic sorption fridges, is accomplished with a paired heater and thermal switch. The heater is responsible for bringing the adsorber to its desorbing temperature, while the thermal switch is responsible for thermally connecting the adsorber to a cooling source (e.g. a liquid helium bath or cryorefrigerator) in order to cool the adsorber to an adsorbing temperature. The adsorber can adsorb and desorb gas up to the carrying capacity of the adsorber itself, providing the pot of the sorption fridge with a set quantity of refrigerant that can be evaporated to provide cooling.

Gaseous refrigerant, however, will not spontaneously become liquid, thus there is a need for a condenser unit that accepts the flow of gas from the adsorber, and upon contact with the gas molecules, provides significant cooling such that the gas condenses to its surface and flows towards the evaporator pot. This is achieved typically by thermally coupling a discrete portion of the sorption fridge between the adsorber and evaporator to a cooling source (e.g. a liquid helium bath or cryorefrigerator). When the adsorber is located above the pot, the condensed liquid refrigerant flows in the direction of gravity towards the pot and collects within.

In the general case, the evaporator pot of a sorption fridge must serve two purposes. Firstly, it must hold a sufficient quantity of condensed refrigerant such that the amount desorbed from the adsorber does not overfill the pot; should the pot overfill, evaporation of refrigerant will occur outside the pot itself and will be too far away from the cold stage of the pot to provide cooling to that desired area. Secondly, the pot should have a means of controlling the evaporation rate such that there is a stabilizing effect on the temperature of the cold surface, and that there is a compromise between the achieved low temperature and the achieved duration of the ON (adsorbing) mode.

In the conventional helium-4 sorption fridge, certain construction techniques are required to hold a sufficient amount of helium within the fridge and allow a reasonably lengthy ON duration, reasonably short OFF duration, and switching response time for a given size of sorption fridge.

FIG. 1 illustrates a prior art adsorption refrigerator 10. The refrigerator comprises an adsorbing pump chamber 100 having a pressure-capable canister or housing 102 constructed of thermally insulating material such as stainless steel except the portion to which the adsorbent material 104 (e.g. activated charcoal) is bonded. The walls of such systems have a thickness to withstand the pressures applied within the system. In single-chamber pump designs like this the walls must be relatively thick and large, causing them to be slow to react to temperature changes, having a relatively large thermal inertia. This portion is comprised of conductive metal, with heat conducting copper fins to aid heat transfer to and from the adsorbing material. The evaporator pot 120 also comprises of a pressure-capable canister 122 constructed of thermally insulating material such as stainless steel, except the cold stage 124 which is comprised of conductive metal, and also with fins to aid heat transfer to and from the liquid, evaporating refrigerant. The connecting tube 130 comprises a thin-walled tube of thermally insulating metal, such that heat can be transferred through the wall to the condenser 110 but minimizes conduction up or down the wall to and from the adsorber 100 and evaporator pot 120. The length of the connecting tube 130 must allow sufficient thermal insulation between the adsorber 100, condenser and evaporator pot 120. As a result of this conventional construction format, sorption fridges are not especially space efficient when attempting to package them into a helium dewar dipstick, or with a closed-cycle cryorefrigerator.

FIG. 2 illustrates an exemplary multi-stage cryogenic refrigeration system 20 according to the prior art. The system is housed in a housing 200. Within the housing 200 are a cryostat 210, which may include more than one stage, such as a first stage 210a and a second stage 210b. These are coupled to an adsorption refrigerator 220 like the one described above. Some unfavorable packaging and manufacturing challenges arise with such systems.

In particular, existing refrigeration systems generally require a bulky cryostat and housing along with associated mechanical support and auxiliary systems. These can be unwieldy, expensive, heavy and take up too much volume for some applications, typically requiring an outer housing diameter of 10 to 14 inches or more. Also, such systems generally offset the cryostat and the sorption refrigerator so that they are mechanically unstable and require special attachments and enclosures. With helium dewars, the sorption fridge is difficult to package in a way such that the liquid helium bath cools the condenser while leaving the adsorber thermally isolated. With cryocooler applications, packaging the sorption fridge concentrically to the cryocooler axis would result in a very long vacuum chamber, whereas packaging the sorption fridge side-by-side with the cryocooler results in a very wide or large-diameter chamber, neither of which is particularly easy or economical to manufacture.

As would be appreciated, existing systems are in constant need of refinement and innovation so as to provide lower temperatures more efficiently, more reliably and more economically in a packaging that is compact and adapted for high-performance applications. The present disclosure is direct to such innovations.

SUMMARY

Various embodiments of the present system are disclosed. In an aspect a novel pump design for use in a cryogenic closed-cycle adsorption refrigerator system includes multiple pump sections that are mechanically configured to suit an application. The multi-pump design allows flexible and compact configurations of the overall cryogenic refrigerator and permits better mechanical layout of its internal components, resulting in more compact refrigeration systems for use in demanding applications. In one aspect, modification to the adsorber portion of a sorption refrigerator moves the location of the connecting tube off-center, and allows the adsorber to take on a form with an interior space that can provide clearance for other components.

Other aspects of the present design benefit from the use of smaller diameter pumps in the multi-pump configuration, which permit the use of thinner pump walls. The lightened pumps result in faster cooldown and require less structural support than conventional monolithic pump designs, and can be filled to a higher pressure. Additionally, the present design offers improvements in the manufacturing and machining process. Furthermore, the present design can be scaled to include a desired number and configuration of pumps, including more pump chambers in the lateral dimension of the system or taller pumps in the vertical dimension of the system. Also, having such a configurable and flexible layout permits the present sorption and cryogenic refrigeration system to be adapted to numerous cryostat units that may be used in conjunction with the system.

Yet other aspects include the manufacture of a single pump system base structure that supports the multiple pumps described above as well as providing fluid flow connections between the multiple pump chambers. In an embodiment, this pump base structure can be machined using a computer numerical control (CNC) machine out of a single block of metal such as copper.

In still other respects, the present design allows for scalability whereby the capacity of the sorption fridge can be increased or decreased by adding more or fewer sorption pump chambers to change the total sorption volume available to the system instead of requiring the manufacture of a new sorption pump chamber as would have been necessary in conventional systems.

The present disclosure uses the terms sorption and adsorption to mean the same thing, which is sometimes also spelled adsorbtion.

One embodiment is directed to a multi-stage cryogenic refrigeration system, comprising an outer housing; a first cooling stage comprising a cryostat within said outer housing; and a second cooling stage comprising a sorption refrigerator, said sorption refrigerator comprising an evaporator; a condenser; a sorption pump assembly comprising (a) a plurality of sorption pump chambers in fluid communication with one another, each said sorption pump chamber having an open end and a closed end defined by at least one wall of a housing, said housing surrounding an interior volume of said sorption pump chamber, said interior volume comprising an adsorbing material, and (b) a shared structural cap directly contacting said open end of each said sorption pump chamber to enclose each said sorption pump chamber, wherein said shared structural cap defines a network of fluid channels that directly interconnects a first and a second of said plurality of sorption pump chambers to one another and that indirectly interconnects a third sorption pump chamber to said first and said second sorption pump chambers, said network of fluid passages extending to said open end of each said sorption pump chamber; and an insulated fluid conduit that extends from said evaporator to one of said fluid channels defined in said shared structural cap, said fluid conduit passing through said condenser.

In an aspect, at least some of said plurality of sorption pump chambers are connected in fluid communication with one another in a series configuration so that a discharge of a first sorption pump chamber is directed to an inlet of a second sorption pump chamber in said pump assembly, with a terminal one of said sorption pump chambers discharging to said condenser of said sorption refrigerator stage.

In an aspect, said shared structural cap comprising a machined copper cap defining said fluid channels and having a plurality of mechanical coupling points to mechanically secure said shared structural cap to said open end of each said sorption pump chamber.

In another aspect, said shared structural cap comprises at least two sections that are mechanically secured to one another.

And in another aspect, said plurality of sorption pump chambers being configured radially with respect to an axis that extends through said insulated fluid conduit.

In still another aspect, said shared structural cap, said evaporator, said condenser, and said cryostat are aligned along axis that extends through said insulated fluid conduit.

And in another aspect, said sorption pump assembly and said shared structural cap being mechanically configured to substantially surround and accept a cold head of said cryostat centrally disposed within said housing of said system and/or said cold head of said cryostat being axially disposed within said sorption refrigerator's sorption pump assembly.

In an aspect, said shared structural cap operates as said condenser, and in another aspect, said shared structural cap is thermally conductive. In some aspects, said shared structural cap is formed of a metal, which may comprise copper, stainless steel, aluminum, and alloys or a combinations of two or more of the foregoing.

And in other aspects, the system may comprise thermal heating elements coupled to or mounted on the shared structural cap.

BRIEF DESCRIPTION OF THE DRAWINGS

For a fuller understanding of the nature and advantages of the present concepts, reference is made to the following detailed description of preferred embodiments and in connection with the accompanying drawings, in which.

DETAILED DESCRIPTION

As mentioned above, present adsorption refrigeration systems lack structural, design and packaging features that would be beneficial in many applications. Furthermore, their designs are bulky, expensive to manufacture and cause the system to cool slower than desired. The present embodiments, which are provided by way of illustration of preferred embodiments and concepts address many problems of the prior art systems.

Figure 1:
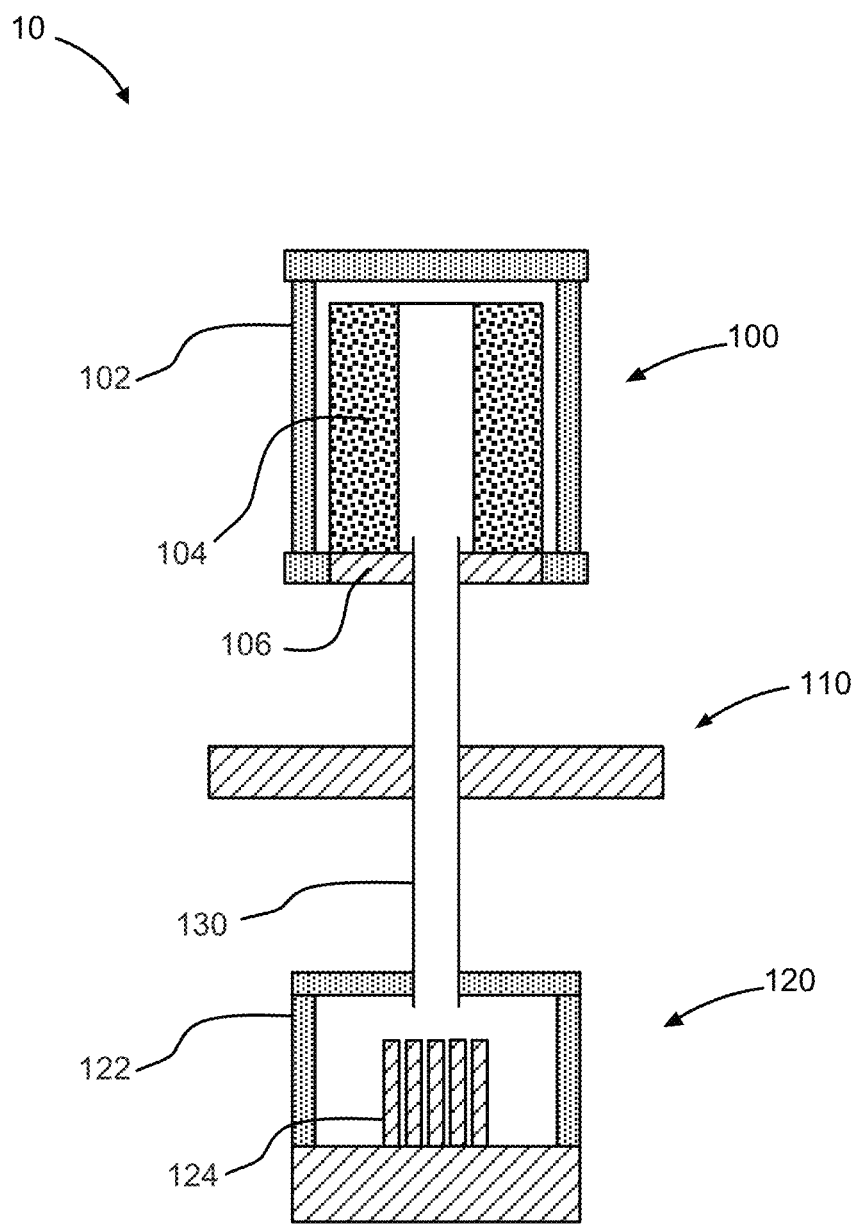
FIG. 1 illustrates an adsorption refrigerator according to the prior art.
Figure 2:
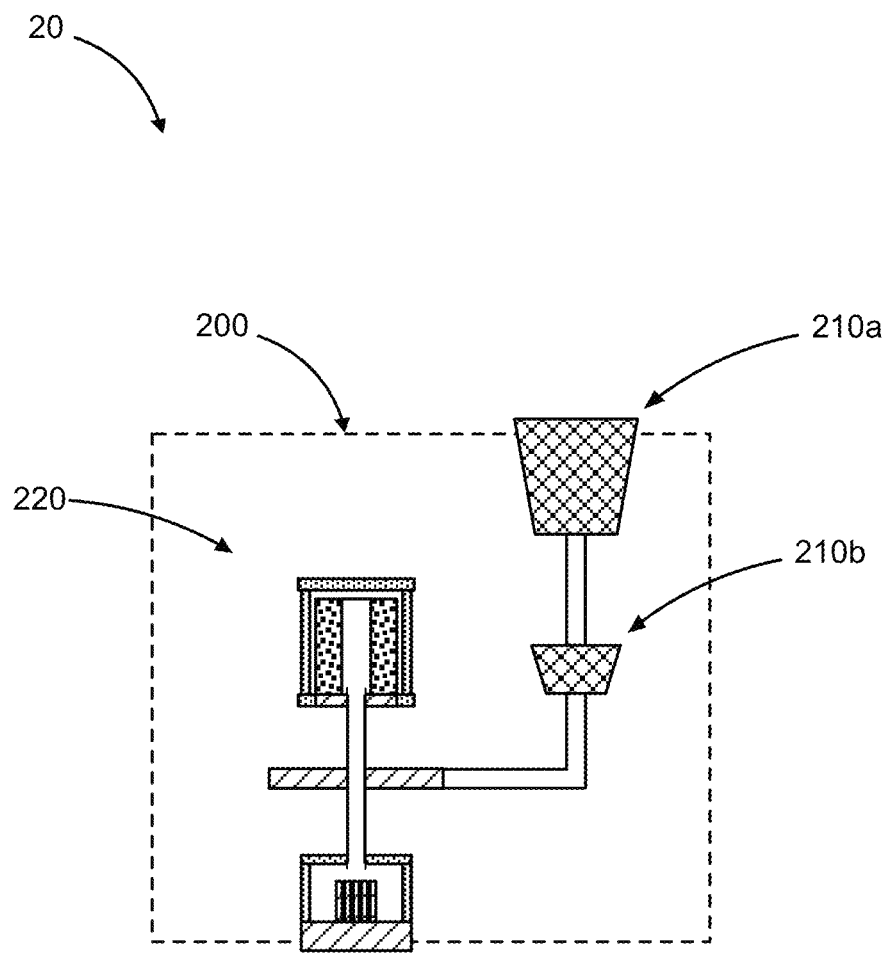
FIG. 2 illustrates a multi-stage cryogenic refrigeration system according to the prior art.
Figure 3A:
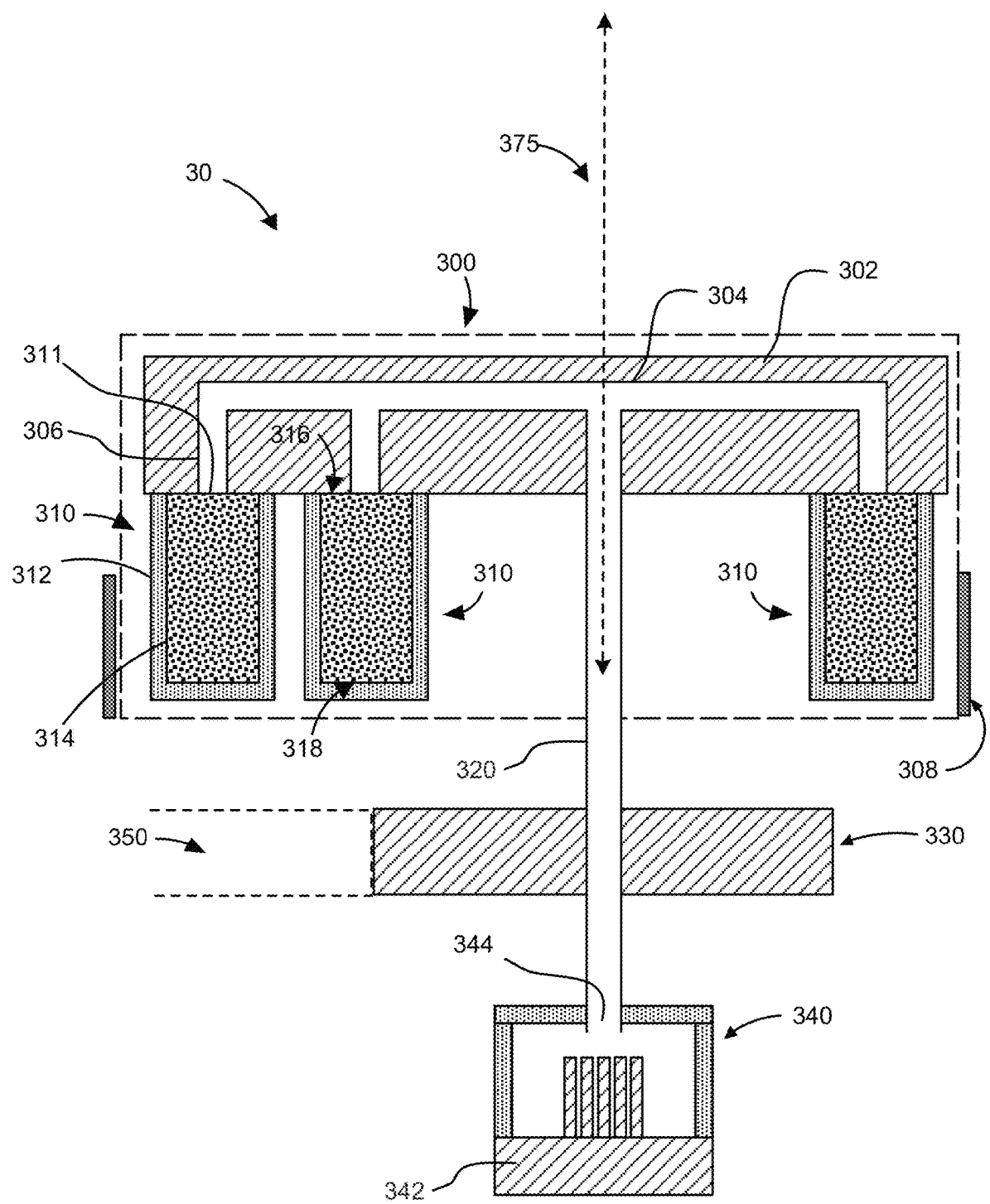
FIGS. 3A, 3B, 3C, 4, 5, and 6 illustrate exemplary cryogenic refrigeration systems according to embodiments hereof, including a multi-chamber sorption pump assembly.

FIG. 3A illustrates a sorption fridge system 30. The system has a sorption pump assembly section 300 comprising a plurality of sorption pump chambers 310. The sorption pump chambers 310 have respective housing walls 312 and contain a sorbent material 314, for example charcoal. The housing walls 312 define and enclose an internal volume of each sorptive pump chamber 310 that includes a sorbtive material 314. The housing walls 312 further define an open end 316 and a closed end 318 of each sorption pump chamber 310. As illustrated, the open end 316 and the closed end 318 are on opposing sides of sorption pump chamber 310. The sorption pump chambers 310 can be formed of a thermally conductive material, such as a metal (e.g., copper, stainless steel, aluminum, a combination of two or more of the foregoing) or other thermally-conductive material.

The pump chambers 310 are closed off at one end by a solid structural cap 302 shared among the plurality of chambers 310. The shared solid structural cap 302 can be in direct physical contact with the housing walls 312 that define the open end 316 of each sorption pump chamber 310. Thus, the shared solid structural cap 302, together with the housing walls 312, define and enclose the internal volume of each sorption pump chamber 310.

The shared structural cap 302 is typically machined from a single piece or block of solid metal, or from two or more pieces or blocks of solid metal. A network of fluid communication channels 304 with fluid couplings 306 leading to two or more of the pump chambers 310 are defined in the shared structural cap 302. Using two or more pieces or blocks of solid metal can be useful to machine the fluid communication channels 304 and fluid couplings 306 in the shared structural cap 302. The two or more pieces or blocks of solid metal can then fused (e.g., by welding or other methods) or adhered back together to form the shared structural cap 304, for example while maintaining a fluid seal for the fluid communication channels 304 and fluid couplings 306 defined therein. In some embodiments, the shared structural cap 302 comprises copper, stainless steel, aluminum, or a combination of two or more of the foregoing. In one or more embodiments, the shared structural cap is thermally conductive.

Figure 3B:
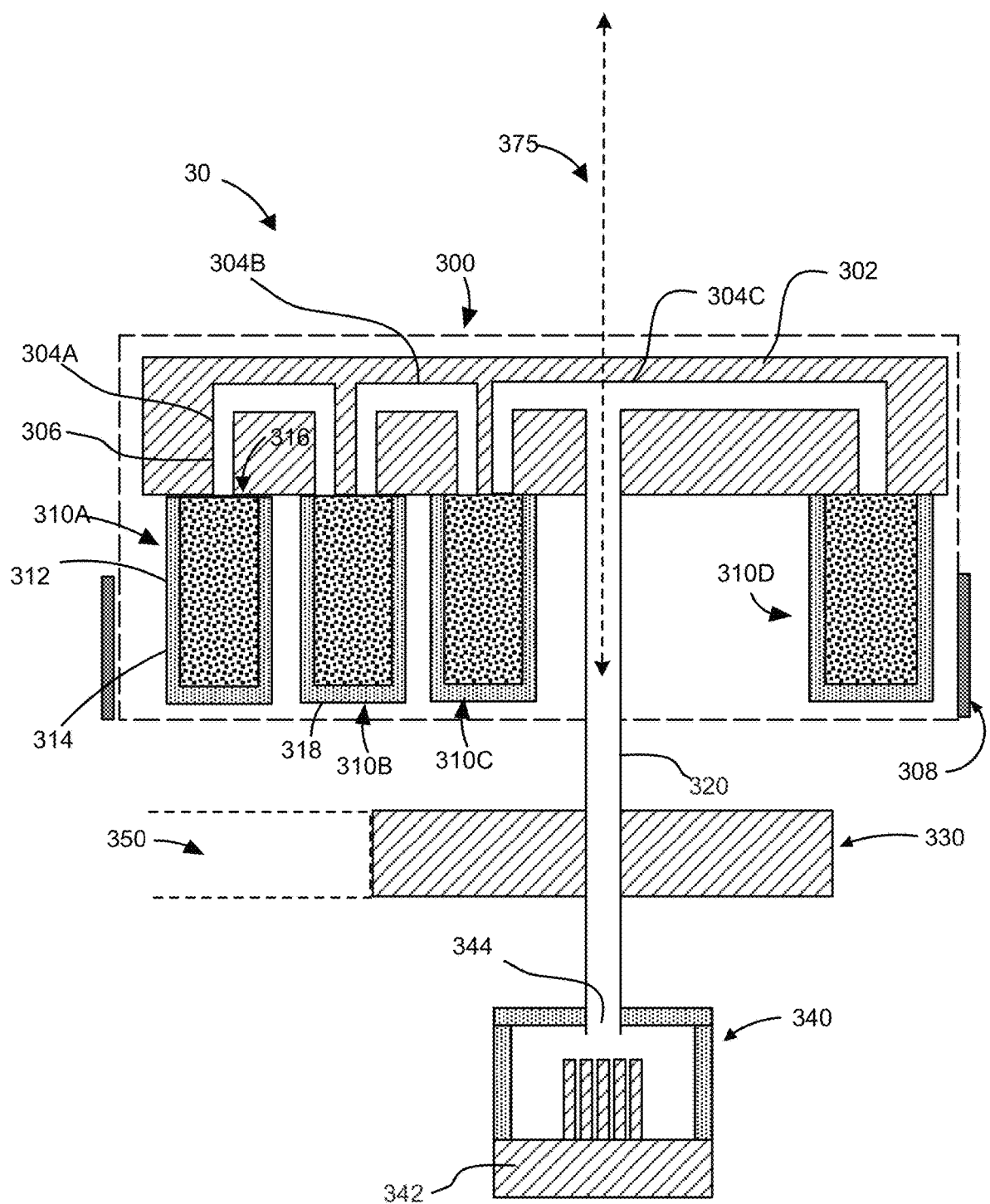

In some embodiments, the network of fluid communication channels 304 defines distinct fluid pathways between two or more of the sorption pump chambers 310. For example, a first fluid pathway can fluidly connect a first sorption pump chamber 310 with a second sorption pump chamber 310. The first fluid pathway can retain the fluid contained therein such that it does not (or cannot) reach a third sorption pump chamber 310 that is outside of the first fluid pathway. An example of such a configuration is illustrated in FIG. 3B, which illustrates three separate fluid communication channels 304A-C connected in series with one another. The first fluid communication channel 304A connects the first and second sorption pump chambers 310A, 310B. The first fluid communication channel 304A does not allow fluid to pass directly into sorption pump chambers 310C or 310D, or into tube 320. The second fluid communication channel 304B connects the second and third sorption pump chambers 310B, 310C. The second fluid communication channel 304A does not allow fluid to pass directly into sorption pump chambers 310A or 310D, or into tube 320. The third fluid communication channel 304C connects the third sorption pump chamber 310C with tube 320 and sorption pump chamber 310D. Thus, in order for fluid located in the first sorption pump chamber 310A to flow into tube 320, the fluid must pass though sorption pump chambers 310B and 310C and fluid communication channels 304A-C. Likewise, in order for fluid located in the second sorption pump chamber 310B to flow into tube 320, the fluid must pass though sorption pump chambers 310C and fluid communication channels 304B,C. It is noted that other connections and networks may be provided in shared structural cap 302. For example, one or more of the fluid communication channel 304A may be interconnected, for example, with additional fluid communication channels that pass into or out the cross-sectional plane illustrated in FIG. 3B (and/or FIG. 3A and/or 3C).

In one embodiment, the separate sorption pump chambers 310 of the sorption pump assembly 300 are generally cylindrical in shape, having a solid casing or housing 312 surrounding the interior volume thereof. The housing of the sorption pump chamber 310, with the portion of shared structural cap 302 covering its remaining end therefore substantially enclose and define the volume of the interior of the sorption pump chamber 310. An opening 311 allows fluid to pass into and out of the chamber 310 and into and out of the sorbtive material 314 as necessary during the cycle of the system 30.

The fluid communication channel 304 is coupled to a tube 320 of low thermal conductivity (e.g., thin-walled stainless steel), which allows the fluid to pass through the cooled condenser 330 and into the evaporator 340. Evaporator 340 and condenser 330 have designs similar to those described earlier. Condensed liquid fluid (e.g., liquid He) can be found in the condenser 340 volume. The system 30 may be thermally coupled to a cold head 350 or other stages of the cooling system.

In some embodiments, the sorption pump chambers 310 can extend radially from an axis 375 that passes through tube 320. In some embodiments, axis 375 is an axis of symmetry with respect to the number and/or location of sorption pump chambers 310. For example, there can be an equal number of sorption pump chambers 310 disposed on either side of axis 375. Similarly, the location of each sorption pump chamber 310 on one side of axis 375 can be the same as the location of each sorption pump chamber 310 on another side (e.g., an opposing side) of axis 375. The location of each sorption pump chamber 310 can be disposed along an axis or radius that is orthogonal to axis 375. For example, if axis 375 is in the "z" direction in a Cartesian coordinate system, the location of each sorption pump chamber 310 can in the x-y plane, such as along the "x" direction or along the "y" direction.

Thermal (e.g., electrical) heating elements 308 may be coupled to and/or mounted on the pump portion 300 of the system 30. In operation, the pump assembly 300 acts as a heat pump bringing He-4 to about 40K, which causes it to expel the helium. If condenser 330 is at 4.2K or below, helium gas starts condensing into liquid helium in evaporator 340. Once sufficient liquid helium has condensed, the heat pump is secured or switched off and pump 300 is cooled by closing a thermal switch between itself and cold head 350. The pump 300 will then begin absorbing helium. The unit 30 can achieve temperatures at the base 342 of evaporator 340 around or below a degree Kelvin in some embodiments, and in an embodiment, a temperature around 0.6K, depending on load and other conditions. An orifice and film killer 344 may be employed to prevent leakage of superfluid liquid helium from evaporator 340.

In an embodiment, the fluid used in the cooling cycle of cryogenic sorption refrigeration system 30 comprises helium gas (e.g., He-4). In an aspect, the system 30 is a closed cycle system that is sealed from the outside so as to not lose or contaminate the fluid. In another aspect, the system 30 can be coupled to other units or stages of a cryocooler apparatus.

As can be seen, the foregoing device can be manufactured in a simple way that is also flexible in its design. The modular multi-chamber pump assembly 300 allows for inclusion of other components within the overall structure of the refrigerator design to optimize their performance and reduce the size of the system.

Figure 6:
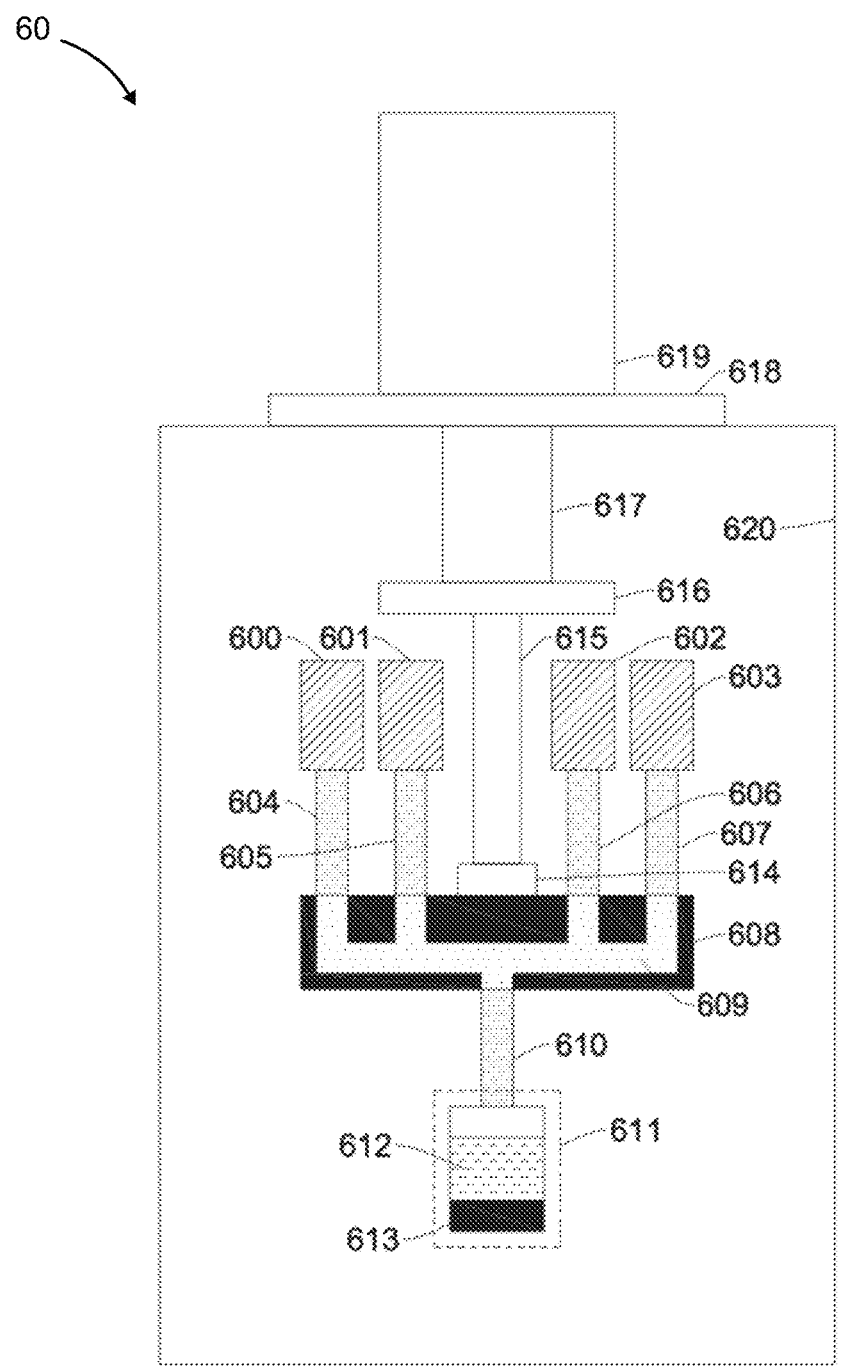

Additionally, those skilled in the art will appreciate that the present design, having smaller individual pump chambers 310 can be made using thinner wall material 312. The compact design and thinner wall thicknesses mean that the system can be cooled more quickly than traditional designs employing a single large sorption pump with the necessary thicker and more massive housing walls. It is noted that the evaporator 330, condenser 340, and shared structural cap 302 can be disposed along or adjacent to axis 375 (e.g., as illustrated in FIGS. 3, 4, and 6), which can provide a more compact design of cryogenic sorption refrigeration system 30. In addition or in the alternative, axis 375 can be an axis of symmetry with respect to the evaporator 330, condenser 340, and shared structural cap 302.

Figure 3C:
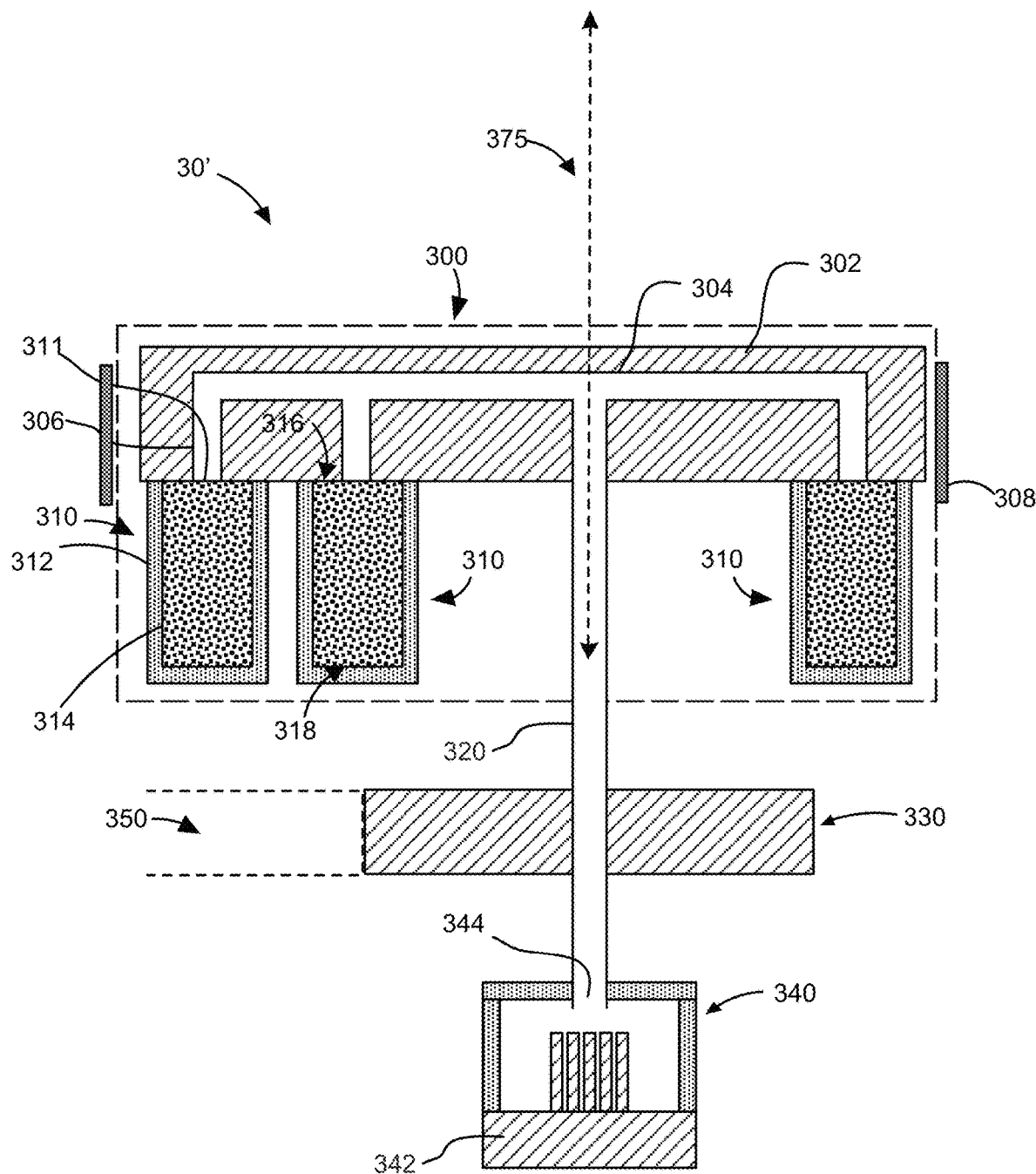
Figure 4:
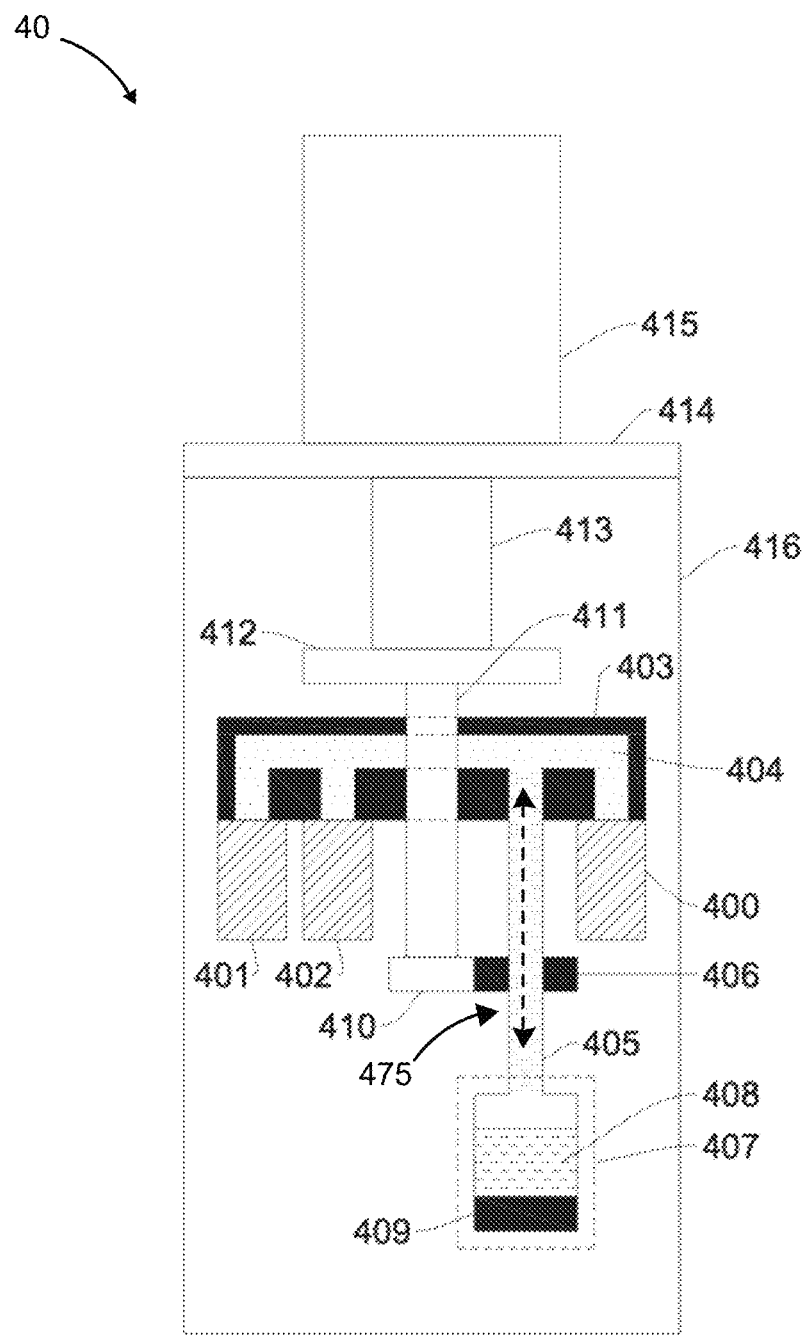

FIG. 3C illustrates a sorption fridge system 30'. Sorption fridge system 30' is the same or similar to sorption fridge system 30 with the exception that the heating elements 308 are coupled to and/or mounted on the shared structural cap 302 of system 30'. The heating elements 308 are in thermal communication with the fluid communication channels 304 through the thermally-conductive shared structural cap 302. The heating elements 308 can also be in thermal communication with the sorption pump chambers 310, through the thermally-conductive shared structural cap 302 and/or through thermal radiation emitted from the heating elements 308. In some embodiments, the heating elements 308 can be disposed along or proximal to at least a portion of a wall (e.g., as illustrated in FIG. 3C) of at least one of the sorption pump chambers 310. Likewise, the heating elements 308 can disposed along or proximal to at least a portion of a surface of the shared structural cap 302 (e.g., as illustrated in FIG. 3C). In other embodiments, the heating elements 308 are disposed along or proximal to at least a portion of a surface of the shared structural cap 302 but they are not disposed along or proximal to at least a portion of a wall of at least one of the sorption pump chambers 310.

FIG. 4 illustrates a croyogenic cooling system 40. The system includes a vacuum chamber 416 capable of holding a vacuum therein. In an example, the vacuum chamber, which also acts as an outer housing for the system 40, has a diameter of about 6 inches. The vacuum chamber housing 416 is enclosed with a mounting flange 414. Atop the flange 414 is mounted a cold head motor assembly 415, to which are coupled a power connector and a pair of helium flex lines connected to a helium compressor (not shown).

A first stage cooler 412, for example a 25K to 40K cooler, is coupled by tube 411 to a second stage cooler 410, which is sub 4K in an example.

The system 40 includes an adsorption refrigeration apparatus like that described above with respect to the previous figure. This portion of the system includes a multi-chamber sorption pump assembly comprising a plurality of sorption pump chambers 400, 401 and 402. The sorption pump chambers 400-402 are enclosed at one end by a common shared support cap 403, which includes fluid passageways 404 permitting fluid flow from one chamber to another. The common shared support cap 403 can be the same or substantially the same as shared structural cap 302, described above. Likewise, sorption pump chambers 400-402 can be the same or substantially the same as sorption pump chambers 310, described above Additionally, the system includes a condenser 406 thermally coupled to the second stage cooler 410. It also has an evaporator 407 containing liquid helium fluid 408 on an evaporator base 409. A tube 405 of low thermal conductivity (e.g., an insulated tube) extends along an axis 475 from a first passageway 404 defined in common shared support cap 403 through condenser 406 to evaporator 407. The evaporator 407, condenser 406, common shared support cap 403, and first stage cooler 412 are disposed along or proximal to axis 475.

An experiment or specimen is usually mounted to or coupled to the evaporator base 409 and reaches the lowest cryogenic temperatures in the system.

Figure 5:
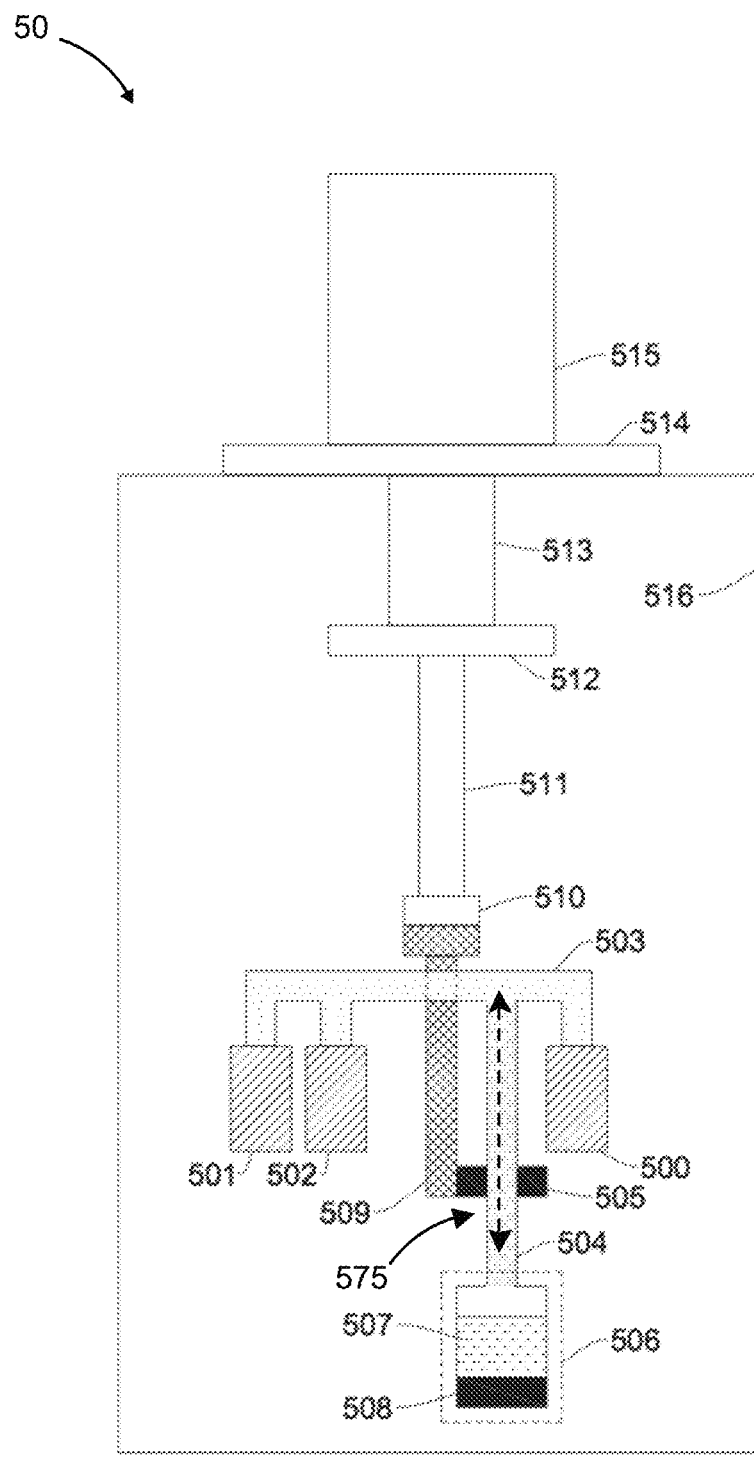

FIG. 5 illustrates another embodiment of a cryogenic cooling system 50. The system is similar to the one previously described, having multiple closed-cycle cooling stages and associated connections 510 through 513 in a vacuum housing 516 and a motor assembly 515 coupled to a flange 514. A thermal coupling 509 thermally couples a cold head (e.g., second stage cryocooler having a temperature, e.g., 4K) to condenser 505.

A sorption pump assembly including a plurality of sorption pump chambers 500, 501, 502 are arranged around the thermal coupling shaft 509. The arrangement can place the pump chambers 501-502 so that they axially surround other components of the system. For example, the pump chambers 500-502 can be disposed about thermal coupling shaft 509, or surrounding other components, e.g., connector tube 504 that extends, along axis 575, down to condenser 505 and evaporator 506. The end result is an efficient and rapid cooling of a sample proximal to the base 508 of evaporator 506 containing fluid 507. The cooling can achieve temperatures below 1K in an embodiment. The evaporator 506, condenser 505, and cold head are disposed along or proximal to axis 575.

FIG. 6 illustrates yet another embodiment of a cryogenic cooling system 60. The system again is surrounded by a vacuum housing 620 supporting a flange 618 and motor 619, leading down through one or more cooling stages 617 through 614. A second stage 614 may be directly or substantially directly to a shared manifold 608 containing fluid passageways 609 allowing fluid communication between at least two sorption pump chambers 600-603 in a multi-chamber sorption pump assembly. Thermally insulating connector tubes 604-607 connect the individual sorption pump chambers 600-603 to respective fluid coupling connections or ports in shared manifold 608. The shared manifold 608 acts as a condenser and is therefore in thermal communication with cooling stage 614 and the fluid passageways 609 are in fluid communication with evaporator 611. Again, the fluid 612 cycles in the refrigeration system to achieve a cold cryogenic temperature below 1K in some embodiments. The shared manifold 608 can be a solid material with fluid passageways 609 defined therein. For example, shared manifold 608 can be the same or substantially the same as common shared support cap 403 and/or shared structural cap 302.

Those of skill in the art will appreciate the flexibility of this design, its compactness compared to prior art single pump systems and the advantages of the thin-walled and rapidly cooled components in the present system.

The present invention should not be considered limited to the particular embodiments described above. Various modifications, equivalent processes, as well as numerous structures to which the present invention may be applicable, will be readily apparent to those skilled in the art to which the present invention is directed upon review of the present disclosure.

What is claimed is:

1. A multi-stage cryogenic refrigeration system (30), comprising:
   a sorption pump assembly (300) having a plurality of sorption pump chambers (310);
   wherein each of said sorption pump chamber has a respective solid outer casing (312) containing a sorbent material (314) therein, wherein a respective end of each of said sorption pump chambers abuts a solid shared structural cap (302) comprising a single piece of metal that is shared among the plurality of sorption pump chambers; and
   wherein said shared structural cap further comprising a network of fluid communication channels (304) therein, the fluid communication channels having a plurality of couplings (306) coupling said fluid communication channels with respective ones of said sorption pump chambers by way of respective openings (311) between the respective sorption pump chambers and said fluid communication channels allowing passage of fluid into and out of each of said sorption pump chambers; and
   a fluid passage tube (320), passing through a condenser (330), and providing fluid flow between said fluid communication channels in the shared structural cap and an evaporator (340).

2. The refrigeration system of claim 1, further comprising a heating element (308) coupled to the pump assembly (300).

3. The refrigeration system of claim 1, wherein said sorbent material comprises charcoal.

4. The refrigeration system of claim 1, wherein said shared structural cap comprises a single piece of machined metal.

5. The system of claim 1, wherein at least two of said plurality of sorption pump chambers are connected in fluid communication with one another in a series configuration so that a discharge of a first sorption pump chamber is directed to an inlet of a second sorption pump chamber in said pump assembly, with a terminal one of said sorption pump chambers discharging to said condenser.

6. The system of claim 1, said shared structural cap comprising a machined copper cap defining said fluid channels and having a plurality of mechanical coupling points to mechanically secure said shared structural cap to an open end of each sorption pump chamber.

7. The system of claim 1, wherein said shared structural cap, said evaporator, and said condenser are axially aligned with said fluid passage tube.

8. The system of claim 1, said sorption pump assembly and said shared structural cap being mechanically configured to substantially surround and accept a cold head of said cryostat centrally disposed within said housing of said system.

9. The system of claim 8, said cold head of said cryostat being axially disposed within said sorption refrigerator's sorption pump assembly.

10. The system of claim 1, wherein said shared structural cap is formed of a metal.

11. The system of claim 10, wherein said shared structural cap comprises copper, stainless steel, aluminum, or a combination of two or more of the foregoing.

* * * * *